(12) United States Patent
Nishii

(10) Patent No.: US 12,517,514 B2
(45) Date of Patent: Jan. 6, 2026

(54) AUTOMATIC TRAVEL SYSTEM

(71) Applicant: Yanmar Power Technology Co., Ltd., Osaka (JP)

(72) Inventor: Yasuto Nishii, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 959 days.

(21) Appl. No.: 17/270,755

(22) PCT Filed: Jul. 11, 2019

(86) PCT No.: PCT/JP2019/027505
§ 371 (c)(1),
(2) Date: Feb. 23, 2021

(87) PCT Pub. No.: WO2020/039786
PCT Pub. Date: Feb. 27, 2020

(65) Prior Publication Data
US 2021/0389771 A1    Dec. 16, 2021

(30) Foreign Application Priority Data

Aug. 24, 2018  (JP) .................................. 2018-157521

(51) Int. Cl.
*G05D 1/02* (2020.01)
*B60Q 9/00* (2006.01)
(Continued)

(52) U.S. Cl.
CPC ............. *G05D 1/0214* (2013.01); *B60Q 9/00* (2013.01); *G05D 1/0088* (2013.01); *G05D 1/0278* (2013.01); *A01B 69/008* (2013.01)

(58) Field of Classification Search
CPC .. G05D 1/0214; G05D 1/0088; G05D 1/0278; G05D 2201/0201; B60Q 9/00; A01B 69/008
(Continued)

(56) References Cited

U.S. PATENT DOCUMENTS 10,251,341 B2   4/2019  Takahara et al.
2007/0198159 A1*  8/2007  Durkos ................ G05D 1/0278
                                                701/50
(Continued)

FOREIGN PATENT DOCUMENTS

CN   106647770 A   1/2017
JP   04160609 A   6/1992
(Continued)

*Primary Examiner* — Mahmoud S Ismail
(74) *Attorney, Agent, or Firm* — Chris Mizumoto

(57) ABSTRACT

The automatic travel system generates a target travel path in a travel driving mode, improves work efficiency, and causes a work vehicle to automatically travel while turning at an appropriate turning radius in the travel driving mode. The system includes: a travel driving mode selection unit that selects one travel driving mode, from among a plurality of travel driving modes, as a travel driving mode for a work vehicle; a travel path generation unit that generates a target travel path by using a turning radius corresponding to the travel driving mode selected by the travel driving mode selection unit; and an automatic travel control unit that performs automatic travel control. A work vehicle is made to automatically travel, based on positioning information for the work vehicle and obtained by a satellite positioning system, along the target travel path generated by the travel path generation unit.

6 Claims, 9 Drawing Sheets

(51) Int. Cl.
  *G05D 1/00*   (2006.01)
  *A01B 69/04*   (2006.01)
(58) Field of Classification Search
  USPC .......................................................... 701/25
  See application file for complete search history.

(56) References Cited

U.S. PATENT DOCUMENTS

2012/0004809 A1*  1/2012  Sasajima ............. B62D 15/028
                                                  701/1
2016/0288828 A1*  10/2016  Ohba ........................ B62D 7/09
2019/0079512 A1*  3/2019  Necker .................. B60K 37/06
2019/0186922 A1*  6/2019  Shinkai ................ G05D 1/0212

FOREIGN PATENT DOCUMENTS

| | | |
|---|---|---|
| JP | 2001018673 A | 1/2001 |
| JP | 2009012717 A | 1/2009 |
| JP | 2016093126 A | 5/2016 |
| WO | 2018/047500 A1 | 3/2018 |

* cited by examiner

FIG. 7

| MODEL | TIRE | TRACK WIDTH | WORK MACHINE | FOUR-WHEEL | FOUR-WHEEL +AB | TWO-WHEEL | TWO-WHEEL +AB | DOUBLE-SPEED | DOUBLE-SPEED +AB |
|---|---|---|---|---|---|---|---|---|---|
| TRACTOR A | TIRE A | 1400 | WORK MACHINE A | 4.0m | -0.5 | -0.5m | -1.0 | -1.0 | -1.5 |
| | | | WORK MACHINE B | ... | ... | ... | ... | ... | ... |
| | | 1500 | WORK MACHINE A | ... | ... | ... | ... | ... | ... |
| | TIRE B | 1400 | WORK MACHINE A | ... | ... | ... | ... | ... | ... |
| | | | WORK MACHINE B | ... | ... | ... | ... | ... | ... |
| | | 1500 | WORK MACHINE A | ... | ... | ... | ... | ... | ... |
| TRACTOR B | | | | | | | | | |

FIG. 8

| MAP | HELP | PATH CREATION – SETTING CONFIRMATION | GNSS/IMU | MENU |

PLEASE CONFIRM THE SETTING CONTENTS AND, IF THEY ARE CORRECT, PRESS "CREATE PATH."
*IF THERE IS AN ERROR IN THE SETTINGS, IT IS POSSIBLE THAT A DANGER WILL ARISE, SUCH AS COLLISION WITH AN EDGE OF THE FIELD.

TRACTOR USAGE CONDITION
  WITH A MANNED TRACTOR TRAVELING SIDE BY SIDE     NON-EDITABLE

WORK REGION
  FIELD NAME: FIELD A
  WORK REGION NAME: WORK REGION A
  AREA: ABOUT xxx ha
  ADDRESS: NEAR aaaaaa WORK START POSITION     [EDIT] — 91
    LATITUDE: 35.000000
    LONGITUDE: 135.000000

WORK END POSITION
    LATITUDE: 35.000000
    LONGITUDE: 135.000000

TRACTOR SETTING
  REGISTRATION NAME: AAAA WHEEL MODEL     [EDIT] — 91
  TRACTOR TYPE: AAAA
  TRACTOR WIDTH: 2.11 m

WORK MACHINE

REGISTRATION NAME: ROTARY
  WORK MACHINE WIDTH: 250 cm
  WORK WIDTH: 240 cm
  LENGTH OF WORK MACHINE: 50 cm     [EDIT] — 91
  LENGTH TO CENTER OF WORK: 35 cm
  REVERSE TRAVEL (BACK) DRIVING: POSSIBLE
  RAISING/LOWERING OF WORK MACHINE: AUTOMATIC
  PTO SETTING: ON
  OVERLAP: 10 cm

MANNED TRACTOR WORK MACHINE
  WORK WIDTH: 240 cm     [EDIT] — 91

TURNING METHOD SETTING
  FORWARD TRAVELING ONLY
  CORRECTED VALUE OF TURNING RADIUS: 1.0 m     [EDIT] — 91
  PER BLOCK BASIS: POSSIBLE
  TRAVEL DRIVING MODE: FOUR-WHEEL
  AUTOMATIC BRAKING: ON

HEADLAND AND UNCULTIVATED LAND SETTING
  A PATH WILL BE CREATED SO AS TO MINIMIZE THE HEADLAND AND UNCULTIVATED LAND,     [EDIT] — 91
  REGARDLESS OF THE WORK WIDTH.

ENGINE-RELATED SETTING
  WORK SUB TRANSMISSION GEAR: CREEP
  VEHICLE SPEED AT THE TIME OF WORKING: 5 km/h
  ENGINE ROTATION SPEED AT THE TIME OF WORKING: 2400 rpm     [EDIT] — 91
  VEHICLE SPEED AT THE TIME OF TURNING: 2 km/h
  ENGINE ROTATION SPEED AT THE TIME OF TURNING: 1200 rpm

[CANCEL]    [CREATE PATH] — 92

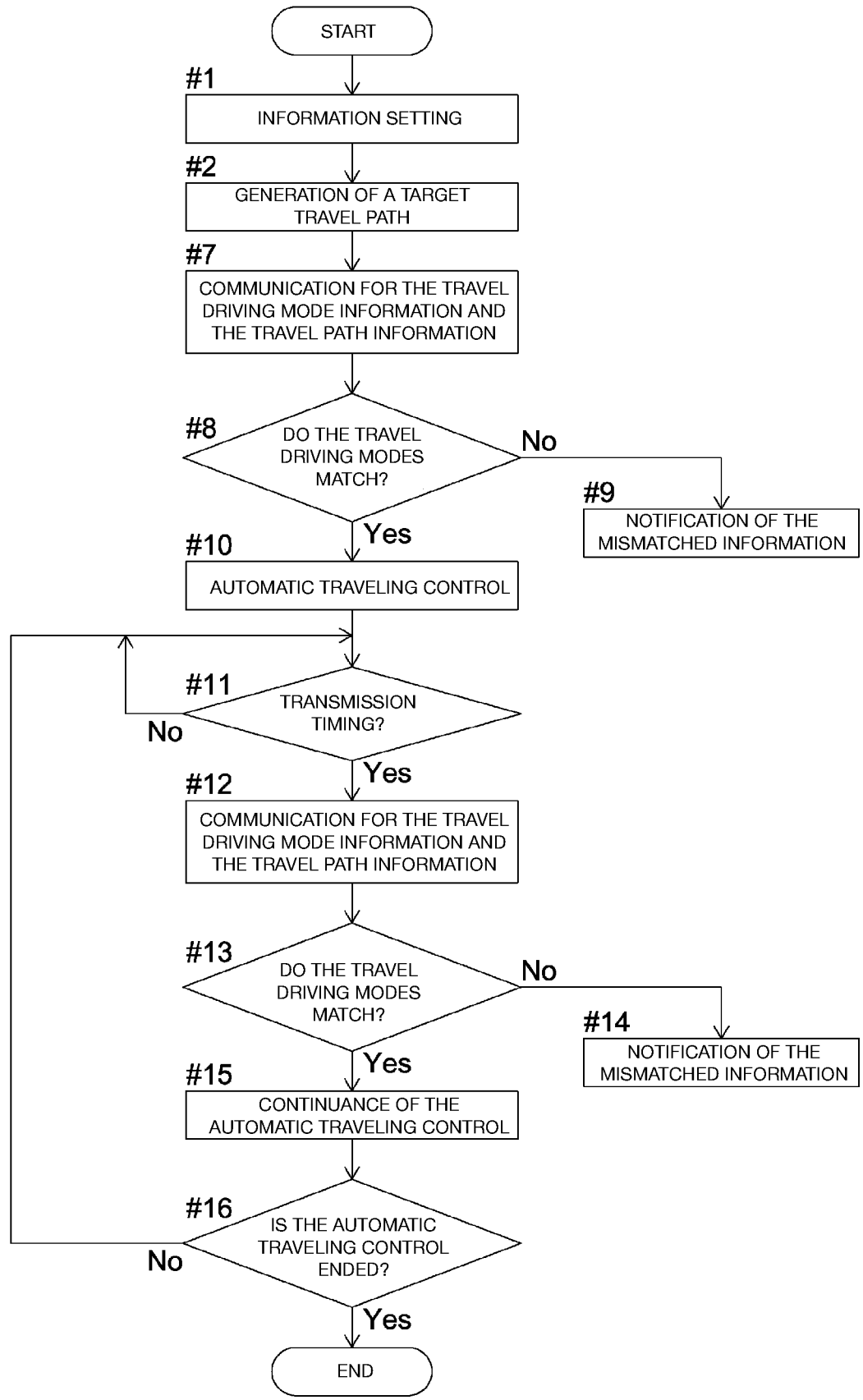

AUTOMATIC TRAVEL SYSTEM

CROSS-REFERENCE

This application is a US National Stage Application under 35 U.S.C. § 371 of International Application No. PCT/JP2019/027505 filed Jul. 11, 2019, which claims foreign priority of JP2018-157521 filed Aug. 24, 2018, the disclosures of which are hereby incorporated by reference in their entirety.

TECHNICAL FIELD

The present invention relates to an automatic travel system that makes a work vehicle automatically travel along a target travel path.

BACKGROUND ART

The above-described automatic travel system makes a work vehicle automatically travel along a target travel path, based on positioning information of the work vehicle, which is acquired by use of a satellite positioning system or the like (see, for example, Patent Literature 1). The target travel path is generated in advance for a work region, based on field information related to the field to be the work region, vehicle body information related to the work vehicle, etc. As the target travel path, a work path on which the work vehicle is made to perform straight traveling while the work device works and a connection path on which the work vehicle is made to perform turning traveling (traveling for changing the direction by 180 degrees) in a state where the work by the work device is stopped are generated. Multiple work paths are generated such that the multiple work paths are arranged in parallel with intervals in the direction orthogonal to the work paths, and multiple connection paths are generated so as to connect end parts of work paths adjacent to each other in the direction orthogonal to the work paths so that the turning traveling from the end point of a work path to the start point of the next work path is performed.

CITATION LIST

Patent Literature

Patent Literature 1: Japanese Unexamined Patent Application Publication No. 2018-75027

DISCLOSURE OF INVENTION

Problems to be Solved by the Invention

As for a connection path on the target travel path, the turning radius for making the work vehicle perform turning traveling is used as the reference for generating a connection path. The size of the turning radius differs depending on, for example, the travel driving mode of the work vehicle. For example, if the travel driving mode of the work vehicle is a four-wheel travel driving mode, the turning radius thereof is larger than that of the two-wheel travel driving mode.

However, it has not been possible to generate a target travel path according to the travel driving mode since the travel driving mode of the work vehicle has not been taken into consideration for generating a target travel path including a connection path.

For example, consider a case in which a connection path is generated with an assumption that the travel driving mode of the work vehicle is a four-wheel travel driving mode. In this case, a sufficient turning radius is secured for making the work vehicle perform turning traveling in the four-wheel travel driving mode, so that it is possible to properly make the work vehicle perform the turning traveling. However, in order to secure a sufficient turning radius, the headland formed between the end part of the work path and the end part of the work region (field) becomes large, and the distance of the work path becomes short. Therefore, when the work vehicle is made to perform turning traveling in a two-wheel travel driving mode, the headland is larger than necessary and the distance of work paths becomes shorter than necessary as well, which causes reduction in the work efficiency.

Further, contrarily, considering a case in which a connection path is generated with an assumption that the travel driving mode of the work vehicle is a two-wheel travel driving mode, the headland can be smaller and the distance of work paths can be longer. However, a sufficient turning radius is not secured for making the work vehicle perform turning traveling in the four-wheel travel driving mode, so that it is not possible to make the work vehicle perform the turning traveling.

In view of this situation, the main object of the present invention is to provide an automatic travel system with which it is possible to generate a target travel path according to a travel driving mode, to improve the work efficiency, and to make a work vehicle automatically travel in a state where turning traveling can be performed with a proper turning radius according to the travel driving mode.

Means for Solving the Problems

The first characteristic configuration of the present invention is to include: a travel driving mode selection unit that is capable of selecting one travel driving mode from multiple travel driving modes as a travel driving mode of a work vehicle; a travel path generation unit that generates a target travel path by use of a turning radius corresponding to the travel driving mode selected by the travel driving mode selection unit; and an automatic travel control unit that performs automatic travel control for making the work vehicle automatically travel along the target travel path generated by the travel path generation unit, based on positioning information of the work vehicle which is acquired by a satellite positioning system.

According to the present configuration, in a case where one travel driving mode is selected by the travel driving mode selection unit, it is possible for the travel path generation unit to generate a target travel path by use of the turning radius corresponding to the selected travel driving mode. The automatic travel control unit can perform the automatic travel control by use of the target travel path generated by the travel path generation unit. In this way, only by selecting one travel driving mode with the travel driving mode selection unit, it is possible to generate a target travel path according to the travel driving mode, and therefore, by making the work vehicle automatically travel along the target travel path, it is possible to improve the work efficiency and make the work vehicle automatically travel so that the turning traveling is performed with a proper turning radius according to the travel driving mode.

The second characteristic configuration of the present invention is to include: a travel driving mode selection unit that is capable of selecting one travel driving mode from multiple travel driving modes as a travel driving mode of a work vehicle; a travel path generation unit that generates a target travel path by use of a turning radius corresponding to the travel driving mode selected by the travel driving mode selection unit; an automatic travel control unit that performs automatic travel control for making the work vehicle automatically travel along the target travel path generated by the travel path generation unit, based on positioning information of the work vehicle which is acquired by a satellite positioning system, in a case where a travel driving mode of a work vehicle side, which is set on the work vehicle, matches the travel driving mode selected by the travel driving mode selection unit; and a mismatched information notification unit that provides a notification of mismatched information, which indicates a mismatch of the travel driving modes, in a case where the travel driving mode of the work vehicle side does not match the travel driving mode selected by the travel driving mode selection unit.

According to the present configuration, in a case where one travel driving mode is selected by the travel driving mode selection unit, the travel path generation unit generates a target travel path by use of the turning radius corresponding to the selected travel driving mode. On the other hand, on the work vehicle, since it is possible for the user or the like to set the travel driving mode of the work vehicle side, the travel driving mode selected by the travel driving mode selection unit does not necessarily match the travel driving mode of the work vehicle side.

Therefore, in a case where the travel driving mode of the work vehicle side matches the travel driving mode selected by the travel driving mode selection unit, the automatic travel control unit performs the automatic travel control. Accordingly, it is possible for the automatic travel control unit to perform the automatic travel control with a confirmation that the travel driving mode of the work vehicle side matches the travel driving mode selected by the travel driving mode selection unit. Therefore, the automatic travel control by the automatic travel control unit can be performed in a proper state where the travel driving modes match, and, at the same time, it is possible to improve the work efficiency and make the work vehicle automatically travel so that the turning traveling is performed with a proper turning radius corresponding to the travel driving mode.

Since the mismatched information notification unit provides a notification of the mismatched information in a case where the travel driving mode of the work vehicle side does not match the travel driving mode selected by the travel driving mode selection unit, it is possible for the user or the like to easily recognize that the travel driving modes do not match. Accordingly, even in a case where the travel driving modes do not match, for example, when the user or the like performs a work of modifying the travel driving mode or the like, it is thereby possible for the automatic travel control unit to perform the automatic travel control in a proper state where the travel driving modes match.

The third characteristic configuration of the present invention is to include a travel driving mode modification unit that modifies the travel driving mode of the work vehicle side, so that the travel driving mode of the work vehicle side matches the travel driving mode selected by the travel driving mode selection unit, in a case where the travel driving mode of the work vehicle side does not match the travel driving mode selected by the travel driving mode selection unit.

According to the present configuration, in a case where the travel driving mode of the work vehicle side does not match the travel driving mode selected by the travel driving mode selection unit, it is possible for the travel driving mode modification unit to automatically modify the travel driving mode of the work vehicle side so that the travel driving mode of the work vehicle side matches the travel driving mode selected by the travel driving mode selection unit. Therefore, since it is not necessary for the user or the like to perform the work of modifying the travel driving mode or the like, the workload of the user or the like is reduced, and, at the same time, it is possible for the automatic travel control unit to perform the automatic travel control in a proper state where the travel driving modes match.

The fourth characteristic configuration of the present invention is that, in a case where the travel driving mode of the work vehicle side does not match the travel driving mode selected by the travel driving mode selection unit, the travel path generation unit regenerates a target travel path by use of a turning radius corresponding to the travel driving mode of the work vehicle side.

According to the present configuration, since the travel path generation unit regenerates a target travel path by use of the travel driving mode of the work vehicle side in a case where the travel driving mode of the work vehicle side does not match the travel driving mode selected by the travel driving mode selection unit, it is possible for the automatic travel control unit to perform the automatic travel control with the target travel path regenerated by the travel path generation unit. Therefore, since it is not necessary for the user or the like to perform the work of modifying the travel driving mode or the like, the workload of the user or the like is reduced, and, at the same time, it is possible to automatically regenerate the target travel path and it is possible for the automatic travel control unit to perform the automatic travel control in a proper state where the travel driving modes match.

The fifth characteristic configuration of the present invention is that: a communication terminal includes the travel driving mode selection unit, the travel path generation unit, and a terminal-side communication unit; the work vehicle includes a vehicle-side communication unit, which is capable of communicating information with the terminal-side communication unit, and the automatic travel control unit; the terminal-side communication unit is configured to be capable of transmitting travel driving mode information, which is related to the travel driving mode selected by the travel driving mode selection unit, and capable of dividing the target travel path into multiple unit path groups, so as to have unit path group information related to the unit path groups, and sequentially transmitting each unit path group information as travel path information related to the target travel path; the automatic travel system includes a determination unit that determines whether or not a travel driving mode based on the travel driving mode information, which is received by the vehicle-side communication unit, matches the travel driving mode of the work vehicle side; and the automatic travel control unit performs the automatic drive control, based on the unit path group information that is sequentially received by the vehicle-side communication unit in a state where the determination unit determines that the travel driving modes match.

According to the present configuration, since the terminal-side communication unit divides the target travel path into multiple unit path groups, so as to have unit path group information related to the unit path groups, and sequentially transmits each unit path group information as the travel path information, it is possible to transmit the travel path information while preventing an increase in the communication amount to be transmitted at once.

Since the terminal-side communication unit transmits the travel driving mode information in addition to the unit path group information, it is possible for the determination unit to compare the travel driving mode based on the travel driving mode information received by the vehicle-side communication unit with the travel driving mode of the work vehicle side, so as to properly determine whether or not the travel driving modes match. Since the automatic travel control unit performs the automatic travel control based on the unit path group information that is sequentially received by the vehicle-side communication unit in a state where the determination unit determines that the travel driving modes match, it is possible for the automatic travel control unit to perform the automatic travel control in a proper state where the travel driving modes match.

Since the travel path information is divided into multiple unit path group information and transmitted, even in a case where the target travel path is modified during execution of the automatic travel control by the automatic travel control unit, the terminal-side communication unit transmits the unit path group information of the modified target travel path, so that it is possible for the automatic travel control unit to perform the automatic travel control by use of the modified target travel path. In this case also, since the automatic travel control unit performs the automatic travel control based on the unit path group information that is sequentially received by the vehicle-side communication unit in a state where the determination unit determines that the travel driving modes match, it is possible for the automatic travel control unit to perform the automatic travel control in a proper state where the travel driving modes match.

The sixth characteristic configuration of the present invention is to include: a travel driving mode acquisition unit that acquires a travel driving mode that is set on a work vehicle; a travel path generation unit that generates a target travel path by use of a turning radius corresponding to the travel driving mode acquired by the travel driving mode acquisition unit; and an automatic travel control unit that performs automatic travel control for making the work vehicle automatically travel along the target travel path generated by the travel path generation unit, based on positioning information of the work vehicle which is acquired by a satellite positioning system.

According to the present configuration, the travel driving mode acquisition unit acquires the travel driving mode that is set on the work vehicle, and the travel path generation unit generates the target travel path by use of the turning radius corresponding to the travel driving mode acquired by the travel driving mode acquisition unit. In this way, the target travel path according to the travel driving mode that is set on the work vehicle can be automatically generated. Therefore, since the automatic travel control unit performs the automatic travel control by use of the target travel path generated by the travel path generation unit, it is not necessary that the user or the like performs the work of modifying the travel driving mode or the like, and, at the same time, it is possible to improve the work efficiency and make the work vehicle automatically travel so that the turning traveling is performed with a proper turning radius according to the travel driving mode.

BRIEF DESCRIPTION OF DRAWINGS

FIG. 7 is a diagram illustrating a relationship for a turning radius.
FIG. 8 is a diagram illustrating a path creation setting confirmation screen.
FIG. 10 is a flowchart illustrating operation when the tractor is made to automatically travel.

DESCRIPTION OF EMBODIMENTS

Embodiments of the automatic travel system according to the present invention will be explained, based on the drawings.

First Embodiment

Figure 1:
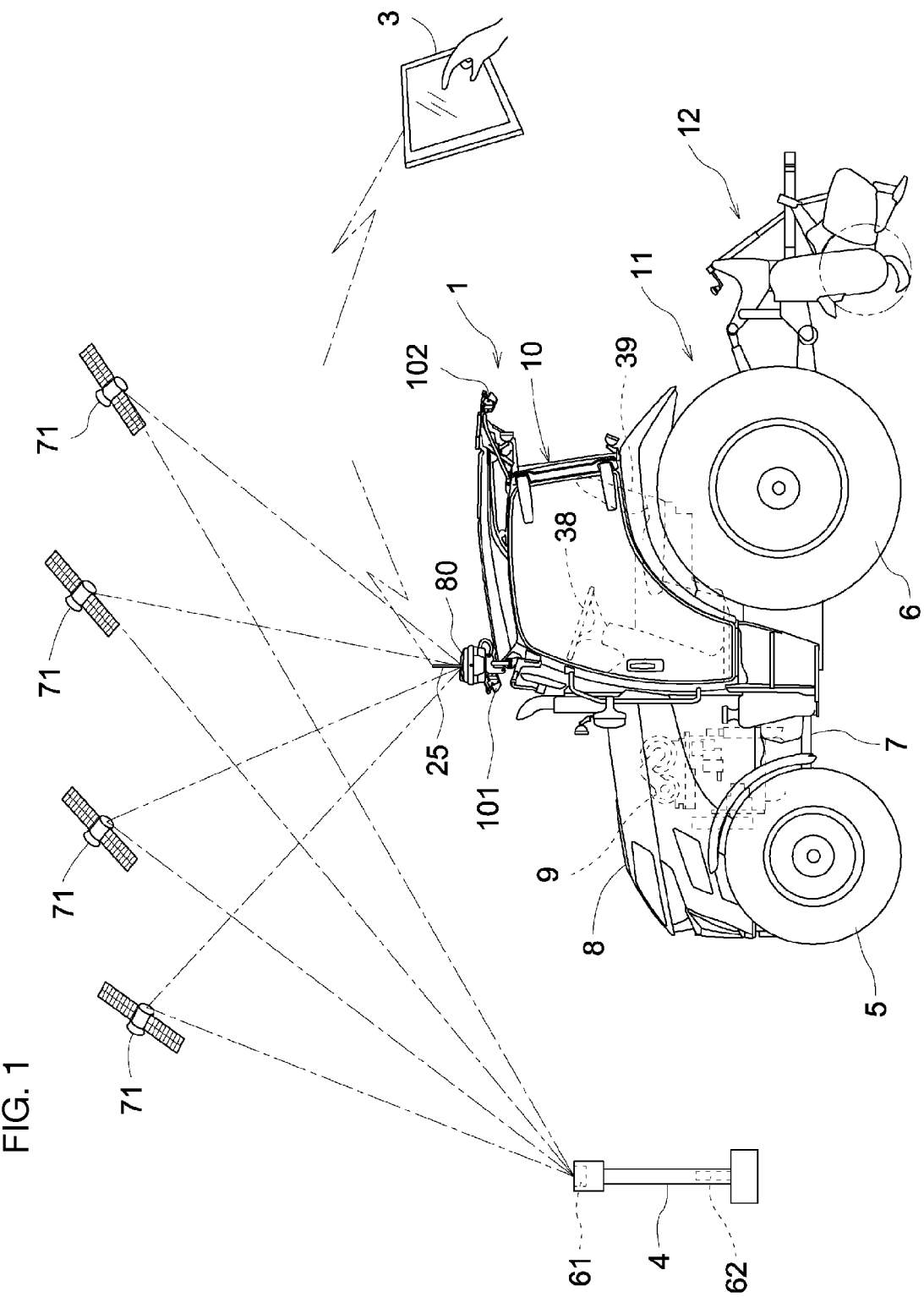
FIG. 1 is a diagram illustrating a schematic configuration of an automatic travel system.

Although the tractor 1 is employed as the work vehicle in this automatic travel system as illustrated in FIG. 1, it is possible that a riding-type work vehicle, such as a riding-type rice transplanter, a combine, a riding-type mower, a wheel loader, or a snowplow, or an unmanned work vehicle, such as an unmanned mower, is employed instead of a tractor.

Figure 2:
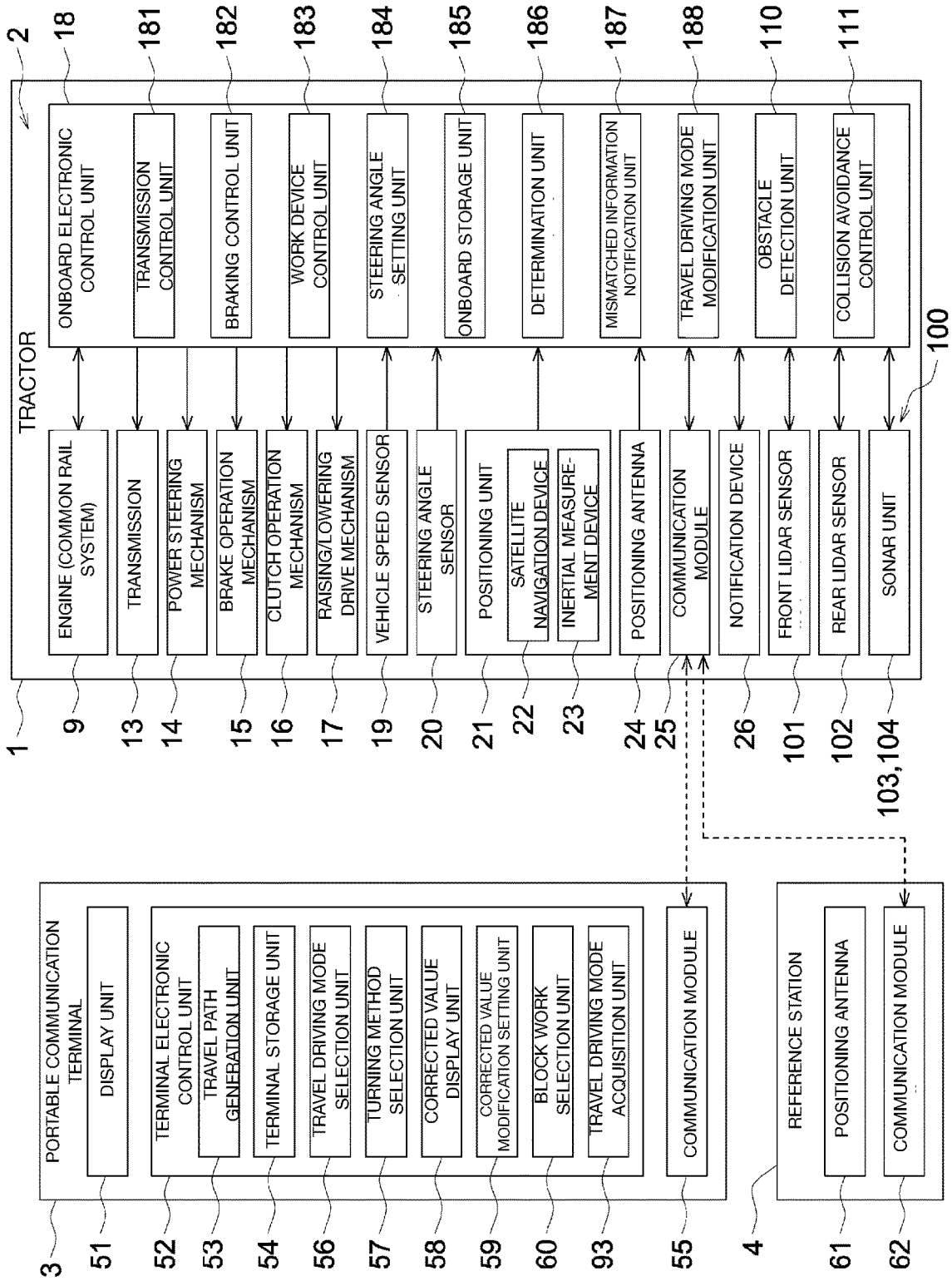
FIG. 2 is a block diagram illustrating a schematic configuration of the automatic travel system.

As illustrated in FIG. 1 and FIG. 2, this automatic travel system includes an automatic travel unit 2, which is mounted on the tractor 1, and a portable communication terminal 3, to which a communication setting for enabling communication with the automatic travel unit 2 is provided. As the portable communication terminal 3, it is possible to adopt a tablet-type personal computer, smartphone, or the like, which is provided with a display unit 51 (for example, a liquid crystal panel) to which a touch-operation can be performed.

The tractor 1 is provided with a travel vehicle body 7 including the left and right drivable front wheels 5, which function as steering wheels, and the left and right drivable rear wheels 6. A bonnet 8 is arranged in the front of the travel vehicle body 7, and an electronically-controlled diesel engine (hereinafter referred to as an engine) 9 having a common rail system is equipped in the bonnet 8. Behind the bonnet 8 of the travel vehicle body 7, there is provided a cabin 10, which forms a boarding-type driving section.

It is possible to configure the tractor 1 as a rotary cultivation model by connecting a rotary cultivation device, which is an example of the work device 12, to the rear part of the travel vehicle body 7 via a three-point link mechanism 11 in such a manner that the rotary cultivation device can move up and down and roll. Instead of a rotary cultivation device, it is possible to connect a work device 12 such as a plow, a seeding device, or a spraying device, to the rear part of the tractor 1.

As illustrated in FIG. 2, the tractor 1 includes an electronically-controlled transmission 13 for changing gears for the power from the engine 9, a full-hydraulic power steering mechanism 14 for steering the left and right front wheels 5, left and right side brakes (not illustrated in the drawing) for putting brakes on the left and right rear wheels 6, an electronically-controlled brake operation mechanism 15 for enabling a hydraulic operation of the left and right side brakes, a work clutch (not illustrated in the drawing) for engaging and disengaging power transmission to the work device 12 such as a rotary cultivation device, an electronically-controlled clutch operation mechanism 16 for enabling a hydraulic operation of the work clutch, an electro-hydraulically-controlled raising/lowering drive mechanism 17 for driving the work device 12 such as a rotary cultivation device to be raised and lowered, an onboard electronic control unit 18 having various kinds of control programs, etc., related to automatic traveling of the tractor 1 or the like, a vehicle speed sensor 19 for detecting a vehicle speed of the tractor 1, a steering angle sensor 20 for detecting steering angles of the front wheels 5, a positioning unit 21 for measuring the current position and the current direction of the tractor 1, etc.

Note that it is also possible that an electronically-controlled gasoline engine including an electronic governor is adopted for the engine 9. For the transmission 13, it is possible to adopt a hydro-mechanical continuously-variable transmission (HMT), a hydro-static continuously-variable transmission (HST), a belt-type continuously-variable transmission, or the like. For the power steering mechanism 14, it is also possible to adopt an electric power steering mechanism 14 including an electric motor or the like.

As illustrated in FIG. 1, a steering wheel 38 for enabling manual steering of the left and right front wheels 5 via the power steering mechanism 14 (see FIG. 2), a driver's seat 39 for a passenger, a touchscreen-type display unit, various kinds of operation tools, etc., are provided inside the cabin 10.

As illustrated in FIG. 2, the onboard electronic control unit 18 includes a transmission control unit 181 for controlling operation of the transmission 13, a braking control unit 182 for controlling operation of the left and right side brakes, a work device control unit 183 for controlling operation of the work device 12 such as a rotary cultivation device, a steering angle setting unit 184 for setting target steering angles of the left and right front wheels 5 at the time of automatic traveling and outputting the target steering angles to the power steering mechanism 14, a non-volatile onboard storage unit 185 for storing a target travel path P (for example, see FIG. 3) that is generated in advance for automatic traveling or the like, etc.

As illustrated in FIG. 2, the positioning unit 21 includes a satellite navigation device 22 for measuring the current position and the current direction of the tractor 1 by use of GPS (Global Positioning System), which is an example of a satellite positioning system (NNS/Navigation Satellite System), an inertial measurement device (IMU/Inertial Measurement Unit) 23 for measuring the posture, direction, etc., of the tractor 1 by use of a three-axis gyroscope and a three-direction acceleration sensor included therein, etc. The positioning methods using GPS include DGPS (Differential GPS), RTK-GPS (Real Time Kinematic GPS), etc. In the present embodiment, RTK-GPS, which is suitable for positioning of a movable object, is adopted. Therefore, as illustrated in FIG. 1 and FIG. 2, a reference station 4 that enables positioning by use of RTK-GPS is installed at a given position in the vicinity of the field.

As illustrated in FIG. 2, the tractor 1 and the reference station 4 respectively include positioning antennas 24 and 61 for receiving radio waves transmitted from positioning satellites 71 (see FIG. 1), communication modules 25 and 62 for enabling wireless communication of various kinds of information including positioning information between the tractor 1 and the reference station 4, etc. Accordingly, the satellite navigation device 22 is capable of measuring the current position and the current direction of the tractor 1 with high precision, based on positioning information acquired by the positioning antenna 24 on the tractor side receiving radio waves from the positioning satellites 71 and positioning information acquired by the positioning antenna 61 on the reference station side receiving radio waves from the positioning satellites 71. In addition, since the positioning unit 21 includes the satellite navigation device 22 and the inertial measurement device 23, it is possible to measure the current position, current direction, and attitude angles (yaw angle, roll angle, pitch angle) of the tractor 1 with high precision.

The positioning antenna 24, the communication module 25, and the inertial measurement device 23 provided in the tractor 1 are housed in the antenna unit 80, as illustrated in FIG. 1. The antenna unit 80 is arranged at an upper position on the front side of the cabin 10.

As illustrated in FIG. 2, the portable communication terminal 3 includes a terminal electronic control unit 52 provided with various kinds of control programs for controlling the operation of the display unit 51, etc., a communication module 55 that enables wireless communication of various kinds of information, which includes positioning information, with the communication module 25 on the tractor side, etc. The terminal electronic control unit 52 includes a travel path generation unit 53 that generates a target travel path P (for example, see FIG. 3) for making the tractor 1 automatically travel, a non-volatile terminal storage unit 54 in which various types of input information input by the user and the target travel path P generated by the travel path generation unit 53 are stored, etc.

The travel path generation unit 53 generates a target travel path P (for example, see FIG. 3) inside a work region S, and the method for generating the target travel path P will be described later.

The target travel path P, which is generated by the travel path generation unit 53, can be displayed on the display unit 51, and travel path information related to the target travel path P is stored in the terminal storage unit 54. The travel path information includes the azimuths of the target travel path P, the set engine rotation speeds and target travel speeds, which are set according to the travel types of the tractor 1 on the target travel path P, etc.

In this way, in a case where the travel path generation unit 53 generates the target travel path P, the terminal electronic control unit 52 transmits the travel path information from the portable communication terminal 3 to the tractor 1 by use of the communication module 55, so that the onboard electronic control unit 18 of the tractor 1 can acquire the travel path information by use of the communication module 25. The onboard electronic control unit 18 can make the tractor 1 automatically travel along the target travel path P, based on the acquired travel path information, while acquiring the current position of itself (the current position of the tractor 1) by use of the positioning unit 21. The current position of the tractor 1, which is acquired by the positioning unit 21, is transmitted on a real-time basis (for example, every few milliseconds) from the tractor 1 to the portable communication terminal 3, so that the portable communication terminal 3 is informed of the current position of the tractor 1.

In a case of starting automatic traveling of the tractor 1, for example, the user or the like moves the tractor 1 to the start point of the target travel path P, and, if various kinds of automatic travel starting conditions are satisfied, the user operates the display unit 51 of the portable communication terminal 3 to provide an instruction for starting automatic traveling, so that the portable communication terminal 3 transmits the instruction for starting automatic traveling to the tractor 1. Accordingly, when the onboard electronic control unit 18 of the tractor 1 receives the instruction for starting automatic traveling, the automatic travel control in which the tractor 1 is made to automatically travel along the target travel path P while acquiring the current position of itself (the current position of the tractor 1) by use of the positioning unit 21 is thereby started. The onboard electronic control unit 18 is configured as an automatic travel control unit that performs automatic travel control for making the tractor 1 automatically travel along the target travel path P in the work region S, based on positioning information of the tractor 1, which is acquired by the positioning unit 21 (corresponding to the satellite positioning system).

The automatic travel control includes automatic transmission control for automatically controlling operation of the transmission 13, automatic braking control for automatically controlling operation of the brake operation mechanism 15, automatic steering control for automatically steering the left and right front wheels 5, working automatic control for automatically controlling operation of the work device 12 such as a rotary cultivation device, etc.

In the automatic transmission control, the transmission control unit 181 automatically controls operation of the transmission 13, so that the target travel speed, which is set according to the travel type, etc., of the tractor 1 on the target travel path P, based on the path information of the target travel path P including the target travel speed, an output from the positioning unit 21, and an output from the vehicle speed sensor 19, is acquired as the vehicle speed of the tractor 1.

In the automatic braking control, the braking control unit 182 automatically controls operation of the brake operation mechanism 15, so that the left and right side brakes properly put a brake on the left and right rear wheels 6 in a braking region, which is included in the path information of the target travel path P, based on the target travel path P and an output from the positioning unit 21.

In the automatic steering control, the steering angle setting unit 184 calculates and sets target steering angles of the left and right front wheels 5, based on the path information of the target travel path P and an output from the positioning unit 21, and the steering angle setting unit 184 outputs the set target steering angles to the power steering mechanism 14, so that the tractor 1 automatically travels on the target travel path P. Based on the target steering angles and an output from the steering angle sensor 20, the power steering mechanism 14 automatically steers the left and right front wheels 5, so as to acquire the target steering angles as the steering angles of the left and right front wheels 5.

Figure 3:
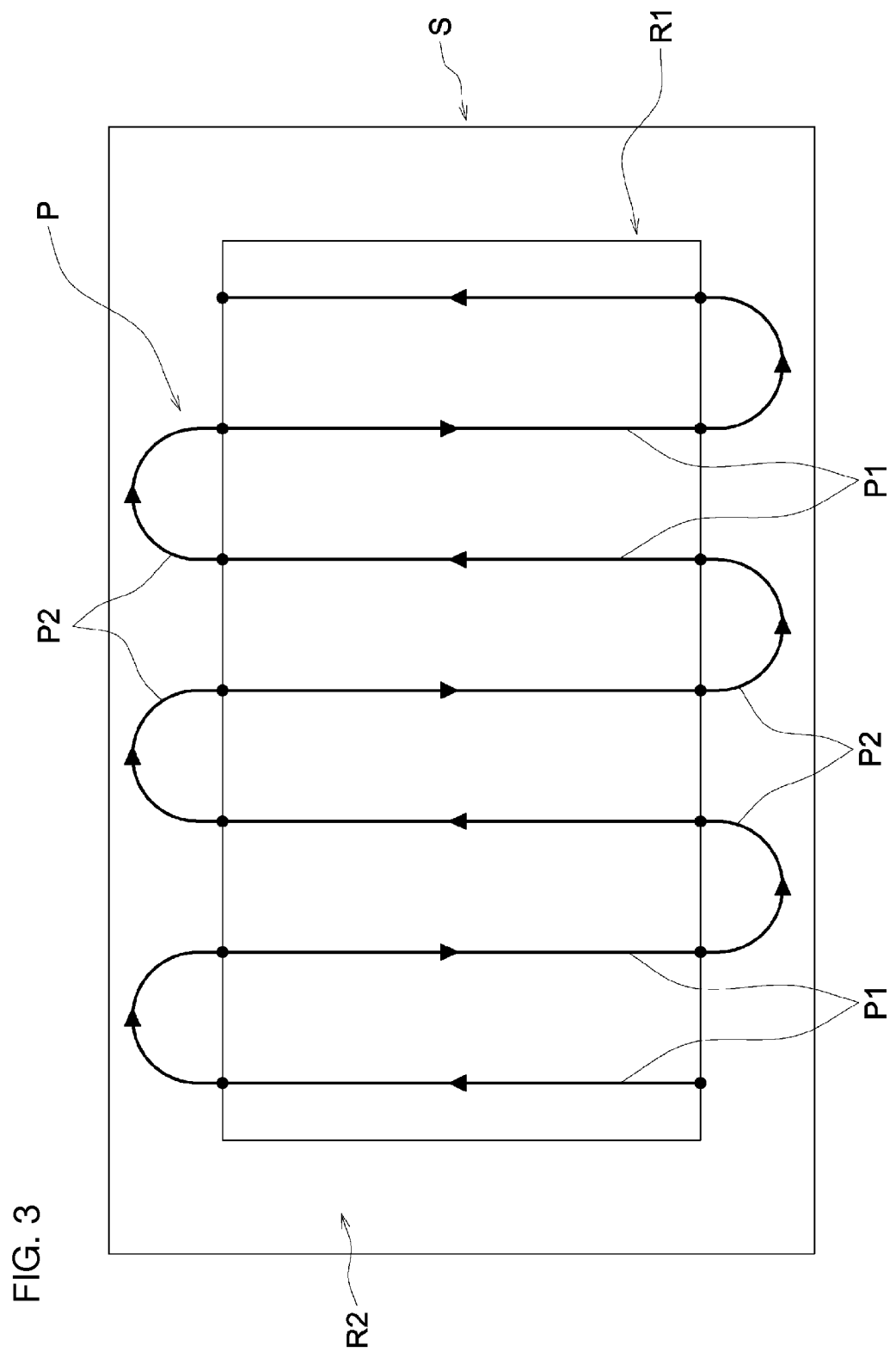
FIG. 3 is a diagram illustrating a work region in a state where a target travel path is set.

In the working automatic control, based on the path information of the target travel path P and an output from the positioning unit 21, the work device control unit 183 automatically controls operation of the clutch operation mechanism 16 and the raising/lowering drive mechanism 17, so that the work device 12 starts a predetermined work (for example, a cultivation work) in response to the tractor 1 reaching a working start point such as the start point of a work path P1 (for example, see FIG. 3) and the work device 12 stops the predetermined work in response to the tractor 1 reaching a working end point such as the end point of a work path P1 (for example, see FIG. 3).

As described above, the automatic travel unit 2 of the tractor 1 is configured with the transmission 13, the power steering mechanism 14, the brake operation mechanism 15, the clutch operation mechanism 16, the raising/lowering drive mechanism 17, the onboard electronic control unit 18, the vehicle speed sensor 19, the steering angle sensor 20, the positioning unit 21, the communication module 25, etc.

In this embodiment, it is possible not only to make the tractor 1 automatically travel without a user or the like being in the cabin 10 but also to make the tractor 1 automatically travel with a user or the like being in the cabin 10. Therefore, it is possible not only to make the tractor 1 automatically travel along a target travel path P by the automatic travel control performed by the onboard electronic control unit 18 without a user or the like being in the cabin 10 but also to make the tractor 1 automatically travel along a target travel path P by the automatic travel control performed by the onboard electronic control unit 18 even in a case where a user or the like is in the cabin 10.

In the case where a user or the like is in the cabin 10, it is possible to switch between an automatic travel state, in which the onboard electronic control unit 18 makes the tractor 1 automatically travel, and a manual travel state, in which the tractor 1 is made to travel based on driving by the user or the like. Therefore, it is possible to switch from the automatic travel state to the manual travel state while the tractor 1 is automatically traveling on the target travel path P in the automatic travel state, and, conversely, it is possible to switch from the manual travel state to the automatic travel state while the tractor 1 is traveling in the manual travel state. As for the switching between the manual travel state and the automatic travel state, for example, it is possible that a switching operation unit for switching between the automatic travel state and the manual travel state is provided in the vicinity of the driver's seat 39, and it is also possible that such a switching operation unit is displayed on the display unit 51 of the portable communication terminal 3. Furthermore, it is possible that, in a case where a user operates the steering wheel 38 during the automatic travel control performed by the onboard electronic control unit 18, the automatic travel state is switched to the manual travel state.

As illustrated in FIG. 1 and FIG. 2, the tractor 1 includes an obstacle detection system 100 for detecting an obstacle around the tractor 1 (travel vehicle body 7) so as to avoid collision with the obstacle. The obstacle detection system 100 includes multiple LiDAR sensors 101 and 102 capable of three-dimensionally measuring the distance to a measurement target object by use of a laser, multiple sonar units 103 and 104 provided with sonars capable of measuring the distance to a measurement target object by use of ultrasonic waves, an obstacle detection unit 110, and a collision avoidance control unit 111.

It is assumed that the measurement target object, which is measured by the LiDAR sensors 101 and 102 and the sonar units 103 and 104, is an object, person, or the like. As the LiDAR sensors 101 and 102, a front LiDAR sensor 101 whose measurement target is the front side of the tractor 1 and a rear LiDAR sensor 102 whose measurement target is the rear side of the tractor 1 are provided. As the sonar units 103 and 104, a right-side sonar unit 103 whose measurement target is the right side of the tractor 1 and a left-side sonar unit 104 whose measurement target is the left side of the tractor 1 are provided.

The obstacle detection unit 110 is configured to perform an obstacle detection process for detecting a measurement target object, such as an object or a person within a predetermined distance, as an obstacle, based on measurement information of the LiDAR sensors 101 and 102 and the sonar units 103 and 104. The collision avoidance control unit 111 is configured to perform collision avoidance control for decelerating the tractor 1 or makes the tractor 1 stop traveling in a case where the obstacle detection unit 110 detects an obstacle. In the collision avoidance control, the collision avoidance control unit 111 not only decelerates the tractor 1 or makes the tractor 1 stop traveling but also activates the notification device 26, such as a notification buzzer or a notification lamp, for notification that an obstacle exists. In the collision avoidance control, the collision avoidance control unit 111 communicates with the portable communication terminal 3 from the tractor 1 by use of the communication modules 25 and 55 to make the display unit 51 display the existence of the obstacle, so that it is possible to provide a notification that the obstacle exists.

The obstacle detection unit 110 repeatedly performs the obstacle detection process based on measurement information of the LiDAR sensors 101 and 102 and the sonar units 103 and 104 on a real-time basis, so as to properly detect obstacles such as objects and people. The collision avoidance control unit 111 performs collision avoidance control for avoiding a collision with an obstacle detected on a real-time basis.

The obstacle detection unit 110 and the collision avoidance control unit 111 are included in the onboard electronic control unit 18. The onboard electronic control unit 18 is communicably connected to an electronic control unit for the engine, which is included in the common rail system, the LiDAR sensors 101 and 102, the sonar units 103 and 104, etc., via CAN (Controller Area Network).

Hereinafter, an explanation is given of generation of a target travel path P by the travel path generation unit 53. For the travel path generation unit 53 to generate a target travel path P, the user or the like, such as a driver or an administrator, inputs turning information and vehicle information such as the type and model of the work vehicle or the work device 12 in accordance with input guidance, which is displayed on the display unit 51 of the portable communication terminal 3 for setting the target travel path, and the input vehicle information and turning information are stored in the terminal storage unit 54. It is assumed that the work region S (see FIG. 3) for which the target travel path P is generated is a field, and the terminal electronic control unit 52 of the portable communication terminal 3 acquires field information including the shape and location of the field and stores the field information in the terminal storage unit 54.

For an explanation of the acquisition of the field information, the user or the like drives the tractor 1 to make the tractor 1 actually travel, so that the terminal electronic control unit 52 can acquire position information for specifying the shape and location of the field from the current position of the tractor 1, which is acquired by the positioning unit 21, etc. The terminal electronic control unit 52 specifies the shape and location of the field from the acquired current position and acquires the field information including the work region S, which is specified by the specified shape and location of the field. In FIG. 3, an example in which the work region S in a rectangular shape is specified is illustrated.

The turning information is information indicating how the turning traveling of the tractor 1 is performed. For example, the turning information includes information indicating a turning method, that is, whether turning traveling is performed in a turning mode without reverse traveling or turning traveling is performed in a turning mode with reverse traveling, and information indicating the turning radius for turning traveling.

Figure 4:
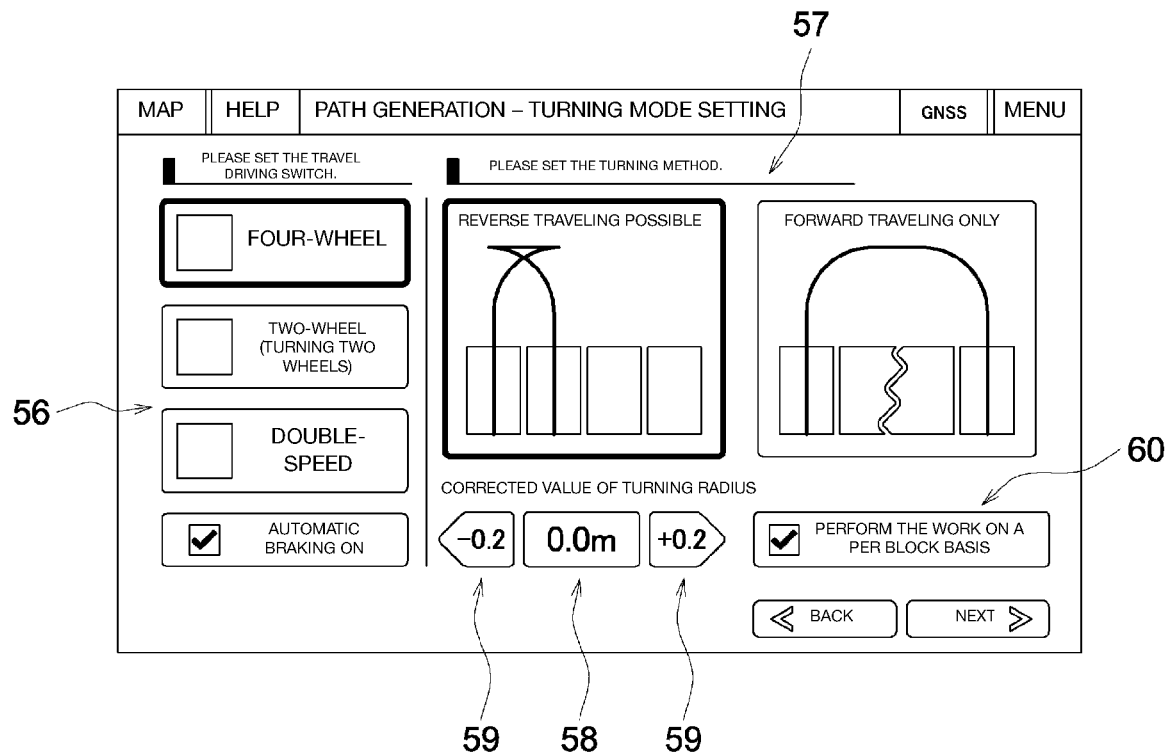
FIG. 4 is a diagram illustrating a screen for inputting turning information.

An explanation is given of the input of turning information. For inputting turning information, a screen for inputting turning information is displayed on the display unit 51 of the portable communication terminal 3 as illustrated in FIG. 4. On this screen for inputting turning information, the travel driving mode selection unit 56 for selecting the travel driving mode of the tractor 1, the turning method selection unit 57 for selecting the turning method, etc., are displayed. Since the turning radius for making the tractor 1 perform turning traveling differs depending on the travel driving mode, the travel driving mode is selected by the travel driving mode selection unit 56 in order to specify the turning radius.

The travel driving mode of the tractor 1 can be selected from a four-wheel travel driving mode in which the tractor 1 is made to travel by four-wheel drive (the top button on the left side in FIG. 4), a two-wheel travel driving mode in which the tractor 1 is made to travel by two-wheel drive (the second button from the top on the left side in FIG. 4), and a double-speed travel driving mode in which the front wheels 5 are made to rotate faster than the rear wheels 6 at the time of turning traveling (the third button from the top on the left side in FIG. 4). For each of the four-wheel travel driving mode, the two-wheel travel driving mode, and the double-speed travel driving mode, it is possible to select whether automatic braking, which is for putting a brake on the rear wheel 6 on the turning side at the time of turning traveling, is turned ON or OFF (the fourth button from the top on the left side in FIG. 4). Note that, in FIG. 4, the example in which the four-wheel travel driving mode is selected in a state where the automatic braking is ON is illustrated. Accordingly, with the travel driving mode selection unit 56, it is possible to select one travel driving mode from six kinds of travel driving modes in total, that is, regarding the three travel driving modes of the four-wheel travel driving mode, the two-wheel travel driving mode, and the double-speed travel driving mode, there are travel driving modes in a state where the automatic braking is ON and travel driving modes in a state where the automatic braking is OFF.

For the turning method, it is possible to select either one of "REVERSE TRAVELING POSSIBLE", in which turning traveling is performed not only with forward traveling but also with reverse traveling (the button at the center in FIG. 4), and "FORWARD TRAVELING ONLY", in which turning traveling is performed only with forward traveling (the button on the right side in FIG. 4), with the turning method selection unit 57. In FIG. 4, the example in which "REVERSE TRAVELING POSSIBLE" is selected is illustrated.

Figure 5:
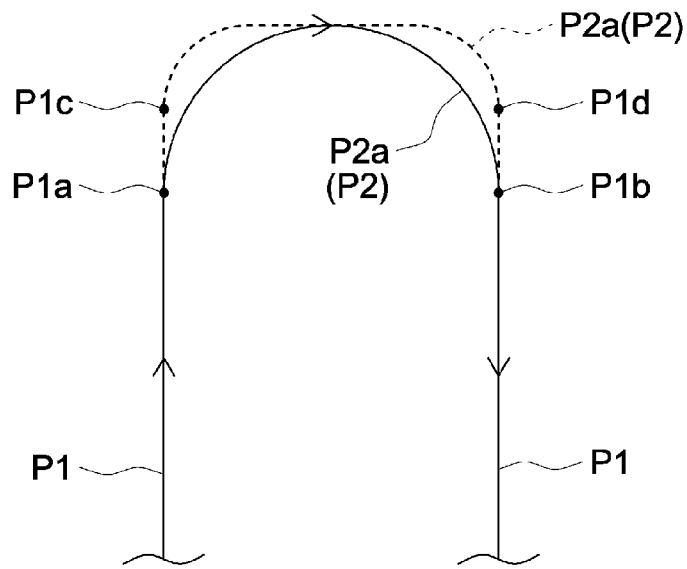
FIG. 5 is a diagram illustrating a connection path on a target travel path.
Figure 6:
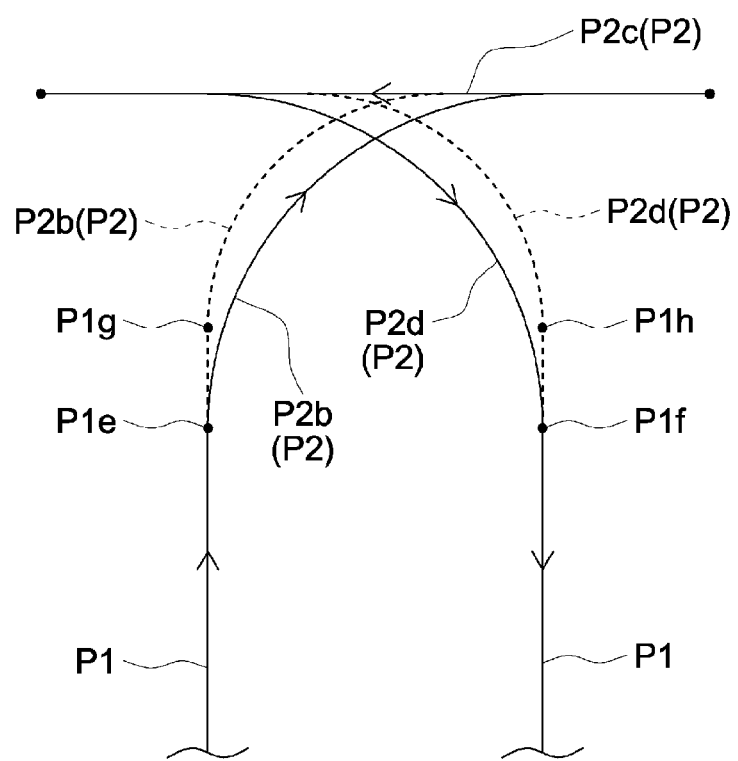
FIG. 6 is a diagram illustrating a connection path on a target travel path.

As illustrated in FIG. 5, in the turning method of a case where "FORWARD TRAVELING ONLY" is selected by the turning method selection unit 57, the turning is performed along a connection path P2 including a first turning path P2a, which is for performing turning traveling by forward traveling so as to turn the travel direction by 180 degrees. As illustrated in FIG. 6, in the turning method of a case where "REVERSE TRAVELING POSSIBLE" is selected by the turning method selection unit 57, the turning is performed along a connection path P2 including a second turning path P2b, which is for performing turning traveling by forward traveling, a reverse traveling path P2c, which is for switching the travel direction from forward traveling to reverse traveling after passing the second turning path P2b so as to perform straight traveling by reverse traveling, and a third turning path P2d, which is for switching the travel direction from reverse traveling to forward traveling after passing the reverse traveling path P2c so as to perform turning traveling by forward traveling.

Returning to FIG. 4, the screen for inputting turning information includes the corrected value display unit 58 that displays a corrected value of the turning radius for the turning traveling, the corrected value modification setting unit 59 that can modify the setting of the corrected value of the turning radius to the plus side or to the minus side, and the block work selection unit 60 that selects whether or not to perform a work on a per block basis. Note that, in a case where performing of the work on a per block basis is selected by the block work selection unit 60, the target travel path P is generated so that the work region S (field) is sectioned into multiple blocks so that the work is performed for each block.

The turning radius at the time of making the tractor 1 perform turning traveling differs depending on the travel driving mode of the tractor 1. For example, as illustrated in FIG. 5, in a case of performing turning traveling when "FORWARD TRAVELING ONLY" is selected by the turning method selection unit 57, the case in which the tractor 1 is made to perform turning traveling in the four-wheel travel driving mode is indicated with the solid line, and the case in which the tractor 1 is made to perform turning traveling in the two-wheel travel driving mode is indicated with the dotted line. In this way, the turning radius on the first turning path P2a in the two-wheel travel driving mode is smaller than the turning radius on the first turning path P2a in the four-wheel travel driving mode. As illustrated in FIG. 6, also in a case of performing turning traveling when "REVERSE TRAVELING POSSIBLE" is selected by the turning method selection unit 57, the turning radius on the second turning path P2b and the third turning path P2d in the two-wheel travel driving mode is smaller than the turning radius in the four-wheel travel driving mode.

The size of the turning radius when the tractor 1 is made to perform turning traveling differs depending on, not only the travel driving mode, but also the vehicle body information such as the model of the tractor 1, the radius and track width of the front wheels 5 and the rear wheels 6 of the tractor 1, and the type and size of the work device 12.

Therefore, as illustrated in FIG. 7, the relationship for the turning radius, which is for specifying the turning radius based on the travel driving mode and the vehicle body information, is set in advance based on experiments, etc., and the relationship for the turning radius is stored in the terminal storage unit 54. The relationship for the turning radius indicates what the turning radius will be for a certain travel driving mode and certain vehicle body information.

In the relationship for the turning radius illustrated in FIG. 7, the turning radius in a case where the travel driving mode and vehicle body information are in a standard state is set as the standard turning radius, and, in a case where the travel driving mode and vehicle body information are in a state that is different from the standard state, a corrected value for the standard turning radius is set as a turning radius. For example, the standard state is a case of the four-wheel travel driving mode in a state where the automatic braking is OFF, where the vehicle body information indicates that the type of the tractor 1 is A, the type of the tires is A, and the type of the work device 12 is A. Note that, in FIG. 7, regarding the distinction between the ON state and the OFF state of the automatic braking, "+AB" is added for the display of the ON state of the automatic braking, and "+AB" is deleted for the display of the OFF state of the automatic braking.

In a case where the travel driving mode selection unit 56 selects one travel driving mode from multiple travel driving modes, the terminal electronic control unit 52 specifies the turning radius (corrected value of the turning radius) corresponding to the selected travel driving mode, as illustrated in FIG. 4, by use of the relationship for the turning radius and the vehicle body information stored in the terminal storage unit 54. The terminal electronic control unit 52 stores the specified turning radius (corrected value of the turning radius) in the terminal storage unit 54 as turning information and displays the specified turning radius in the corrected value display unit 58 as the corrected value of the turning radius. For example, since the turning radius becomes the standard turning radius in a case where the four-wheel travel driving mode is selected in a state where the automatic braking is OFF, the corrected value of the turning radius in the corrected value display unit 58 becomes "0.0 m". In a case where the two-wheel travel driving mode is selected in a state where the automatic braking is OFF, since "−0.5 m" is set as the corrected value for the turning radius in the relationship for the turning radius illustrated in FIG. 7, the corrected value of the turning radius in the corrected value display unit 58 becomes "−0.5 m".

An explanation is given of the generation of a target travel path P. The travel path generation unit 53 generates a target travel path P by use of the field information, vehicle body information, turning information, etc., which are stored in the terminal storage unit 54. As illustrated in FIG. 3, the travel path generation unit 53 segments the work region S to set the central region R1 and the outer peripheral region R2. The central region R1, which is set to be the central part of the work region S, is a reciprocating work region in which the tractor 1 is made to automatically travel in a reciprocating direction to perform a predetermined work (for example, a work such as cultivation). The outer peripheral region R2 is set around the central region R1. The travel path generation unit 53 calculates a space for turning traveling, which is required for making the tractor 1 perform turning traveling at the shore of the field, based on the turning radius included in the turning information, the front-rear width and the left-right width of the tractor 1 included in the vehicle body information, etc., for example. The travel path generation unit 53 segments the work region S into the central region R1 and the outer peripheral region R2, so as to ensure the calculated space, etc., in the outer periphery of the central region R1.

As illustrated in FIG. 3, the target travel path P includes multiple linear work paths P1, which have the same straight travel distance in the central region R1 and are arranged and set in parallel with a constant distance corresponding to the work width, and connection paths P2 for connecting the start point and the end point of adjacent work paths P1. The multiple work paths P1 are paths in which the tractor 1 is made to travel straight to perform a predetermined work. The connection paths P2 are paths in which the tractor 1 is made to change travel direction by 180 degrees without performing the predetermined work, and a connection path P2 connects the end point of a work path P1 and the start point of the next work path P1 that is adjacent. Note that the target travel path P illustrated in FIG. 3 is merely an example, and the setting of the target travel path can be modified as appropriate.

An additional explanation is given of the generation of a connection path P2. The travel path generation unit 53 generates a connection path P2, based on the turning method and the turning radius included in the turning information stored in the terminal storage unit 54. As illustrated in FIG. 5, in a case where the turning method of "FORWARD TRAVELING ONLY" is selected by the turning method selection unit 57, a connection path P2 including a first turning path P2a for performing turning traveling by forward traveling so as to turn the travel direction by 180 degrees is generated. The target travel path P illustrated in FIG. 3 indicates a case in which the turning method of "FORWARD TRAVELING ONLY" is selected by the turning method selection unit 57.

The terminal electronic control unit 52 specifies the turning radius of the first turning path P2a by use of the relationship for the turning radius, which is stored in the terminal storage unit 54 and based on the vehicle body information and the state selected by the travel driving mode selection unit 56. For example, in a case where the four-wheel travel driving mode is selected in a state where the automatic braking is OFF, the corresponding turning radius (corrected value of the turning radius) in the relationship for the turning radius illustrated in FIG. 7 is specified, and, in a case where the two-wheel travel driving mode is selected in a state where the automatic braking is OFF, the corresponding turning radius (corrected value of the turning radius) in the relationship for the turning radius illustrated in FIG. 7 is specified.

As illustrated in FIG. 5, the turning radius of the first turning path P2a in the two-wheel travel driving mode (indicated with the dotted line) can be smaller than that of the first turning path P2a in the four-wheel travel driving mode (indicated with the solid line). Accordingly, the end point P1c of a work path P1 and the start point P1d of the next work path P1 in the two-wheel travel driving mode can be positioned on an end part side (the upper side in FIG. 5) of the work region S, relative to the end point P1a of a work path P1 and the end point P1b of the next work path P1 in the four-wheel travel driving mode. Therefore, the travel path generation unit 53 can generate a longer work path P1 in the two-wheel travel driving mode, compared to the length of a work path P1 in the four-wheel travel driving mode. In this way, the travel path generation unit 53 generates a connection path P2 by use of the turning radius corresponding to the travel driving mode selected by the travel driving mode selection unit 56 and generates a work path P1 having the length corresponding to the connection path P2, so as to generate a proper target travel path P.

As illustrated in FIG. 6, in a case where the turning method of "REVERSE TRAVELING POSSIBLE" is selected by the turning method selection unit 57, the travel path generation unit 53 generates a connection path P2 including a second turning path P2b, which is for performing turning traveling by forward traveling, a reverse traveling path P2c, which is for switching the travel direction from forward traveling to reverse traveling after passing the second turning path P2b so as to perform straight traveling by reverse traveling, and a third turning path P2d, which is for switching the travel direction from reverse traveling to forward traveling after passing the reverse traveling path P2c so as to perform turning traveling by forward traveling.

The terminal electronic control unit 52 specifies the turning radius of the second turning path P2b and the third turning path P2d by use of the relationship for the turning radius (see FIG. 7), which is stored in the terminal storage unit 54 and based on the vehicle body information and the state selected by the travel driving mode selection unit 56. In this case also, the turning radius of the second turning path P2b and the third turning path P2d in the two-wheel travel driving mode (indicated with the dotted lines) can be smaller than that of the second turning path P2b and the third turning path P2d in the four-wheel travel driving mode (indicated with the solid lines). Accordingly, the end point P1g of a work path P1 and the start point P1h of the next work path P1 in the two-wheel travel driving mode can be positioned on an end part side (the upper side in FIG. 6) of the work region S, relative to the end point P1e of a work path P1 and the end point P1f of the next work path P1 in the four-wheel travel driving mode. Therefore, the travel path generation unit 53 can generate a longer work path P1 in the two-wheel travel driving mode, compared to the length of a work path P1 in the four-wheel travel driving mode.

Here, since the path creation setting confirmation screen is displayed on the display unit 51 of the portable communication terminal 3 as illustrated in FIG. 8, the input vehicle body information and turning information can be confirmed by the user or the like. On the path creation setting confirmation screen in FIG. 8, it is possible to confirm, not only the turning information (the third displayed field from the bottom in FIG. 8), but also various kinds of information such as the address of the work region S, the field information including the latitude and longitude of the work start position and the work end position or the like, the vehicle body information including the type of the tractor 1, the type of the work machine (work device 12), or the like.

The settings of the input vehicle body information and turning information can be modified. For example, as illustrated in FIG. 8, when the user or the like presses a detail button 91 on the path creation setting confirmation screen, the path creation setting confirmation screen transitions to the modification setting screen on which the settings of various kinds of information can be modified, so that it is possible for the user or the like to modify the settings of the various kinds of information on the modification setting screen.

In a case where the settings of the vehicle body information, turning information, etc., are modified, it is also possible to generate a target travel path P by use of the vehicle body information and turning information after the modification of settings. On the path creation setting confirmation screen illustrated in FIG. 8, by pressing the path generation instruction button 92 of "GENERATE PATH", the travel path generation unit 53 generates a target travel path P by use of the vehicle body information, turning information, etc., after the modification of settings. In this way, in a case where the user or the like operates the display unit 51 of the portable communication terminal 3 so as to modify the settings of the vehicle body information, turning information, etc., after the target travel path P is once generated by the travel path generation unit 53, it is possible for the travel path generation unit 53 to regenerate a target travel path P by use of the vehicle body information, turning information, etc., after the modification of settings. In a case where a target travel path P is regenerated, it is only needed to operate the path generation instruction button 92 on the path creation setting confirmation screen illustrated in FIG. 8 without transitioning to another display screen after modification of the settings of the vehicle body information, turning information, etc., so that it is possible to improve the operability.

The operation for making the tractor 1 automatically travel will be explained based on the flowchart in FIG. 9. First, the user or the like performs the work of acquiring the field information and the work of inputting the vehicle body information, turning information, etc., in order to set the automatic travel information, in which various kinds of information for performing automatic traveling is set (Step #1). When the information is set, the travel path generation unit 53 generates a target travel path P in the work region S, based on the various kinds of set information (Step #2). Here, the travel path generation unit 53 specifies the turning radius corresponding to the travel driving mode selected by the travel driving mode selection unit 56 and generates the target travel path P including a work path P1 and a connection path P2 by use of the specified turning radius.

By use of the communication module 55, the terminal electronic control unit 52 transmits travel driving mode information, which is related to the travel driving mode selected by the travel driving mode selection unit 56, and travel path information, which is related to the target travel path P generated by the travel path generation unit 53. By use of the communication module 25, the onboard electronic control unit 18 receives the travel driving mode information and the travel path information transmitted by the communication module 55. In this way, communication for the travel driving mode information and the travel path information is performed (Step #3).

As for the travel driving mode, the user can operate the operation unit, etc., on the tractor 1 side, in order to set one travel driving mode from multiple travel driving modes on the tractor 1 side. In a case where the tractor 1 is made to automatically travel in practice, the tractor 1 is made to automatically travel in the travel driving mode of the work vehicle side, which is set on the tractor 1 side. Therefore, it is required that the travel driving mode selected by the travel driving mode selection unit 56 matches the travel driving mode of the work vehicle side, which is set on the tractor 1 side.

Therefore, as illustrated in FIG. 2, the tractor 1 includes the determination unit 186 that determines whether or not the travel driving mode selected by the travel driving mode selection unit 56 matches the travel driving mode of the work vehicle side, which is set on the tractor 1 side, and the mismatched information notification unit 187 that provides a notification of mismatched information that indicates a mismatch of the travel driving modes in a case where the travel driving mode selected by the travel driving mode selection unit 56 does not match the travel driving mode of the work vehicle side, which is set on the tractor 1 side.

Figure 9:
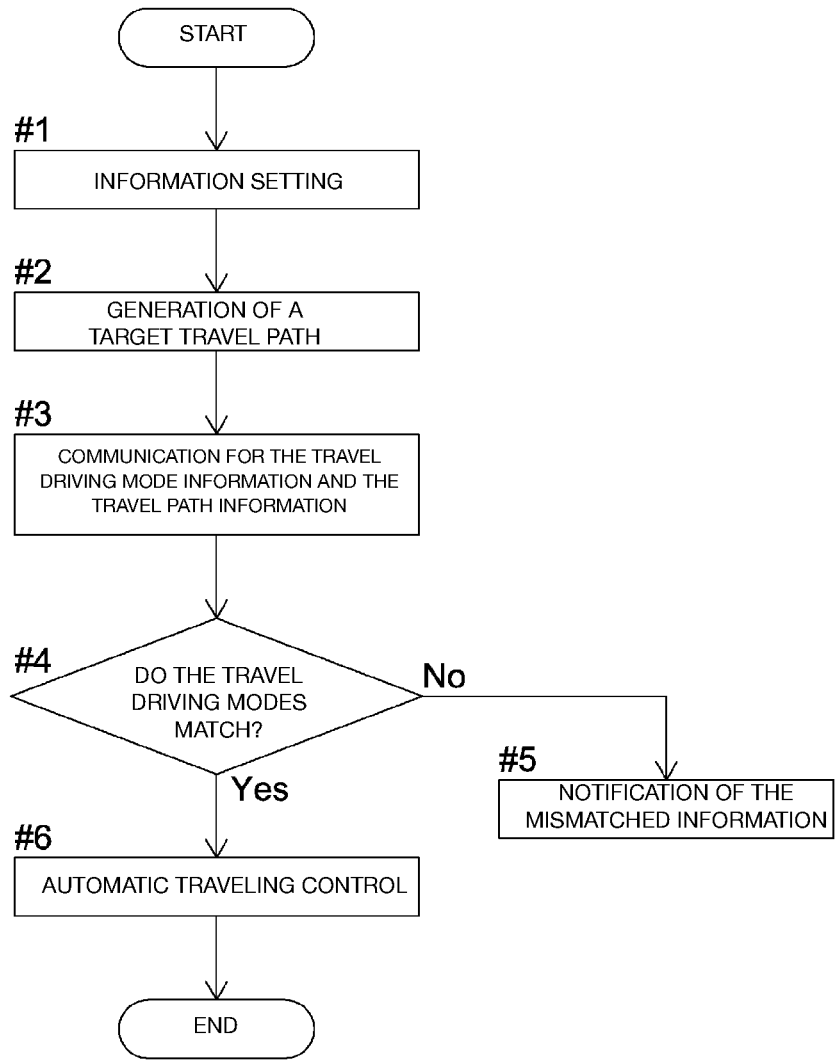
FIG. 9 is a flowchart illustrating operation when a tractor is made to automatically travel.

As illustrated in FIG. 9, when the communication for the travel path information and the travel driving mode information is performed, the determination unit 186 determines whether or not the travel driving mode selected by the travel driving mode selection unit 56 matches the travel driving mode of the work vehicle side, which is set on the tractor 1 side (Step #4).

In a case where the determination unit 186 determines that the travel driving mode selected by the travel driving mode selection unit 56 does not match the travel driving mode of the work vehicle side, the mismatched information notification unit 187 provides a notification of the mismatched information (Step #5 in a case of No in Step #4). The mismatched information notification unit 187 makes the notification device 26 of the tractor 1 operate or makes the display unit of the tractor 1 display the mismatched information, so as to provide a notification of the mismatched information on the tractor 1 side, and transmits the mismatched information from the tractor 1 to the portable communication terminal 3 by use of the communication module 25. The terminal electronic control unit 52 makes the display unit 51 display the mismatched information received by the communication module 55, so as to provide a notification of the mismatched information on the portable communication terminal 3 side.

When the notification of the mismatched information is provided, the user or the like can recognize that the travel driving modes do not match. Therefore, the user or the like operates the operation unit, etc., of the tractor 1 so as to modify the travel driving mode of the work vehicle side, in order to perform a restoration work such as a travel driving mode modification work, in which the travel driving mode of the work vehicle side is made to match the travel driving mode selected by the travel driving mode selection unit 56.

In a case where the determination unit 186 determines that the travel driving mode selected by the travel driving mode selection unit 56 matches the travel driving mode of the work vehicle side, the onboard electronic control unit 18 starts executing the automatic travel control upon receiving an instruction for starting the automatic traveling from the portable communication terminal 3, in order to make the tractor 1 automatically travel along the target travel path P (Step #6 in a case of Yes in Step #4).

In this way, it is possible to make the tractor 1 automatically travel along the target travel path P in a state where the travel driving mode selected by the travel driving mode selection unit 56 and the travel driving mode of the work vehicle side are made to match. Therefore, it is possible to properly make the tractor 1 automatically travel along the target travel path P which includes a connection path P2 according to the turning radius corresponding to the travel driving mode selected by the travel driving mode selection unit 56.

As for the travel path information, when the terminal electronic control unit 52 transmits the travel path information, it is possible to divide the travel path information into multiple unit path group information and sequentially transmit each unit path group information, instead of transmitting information of all of the travel path information at once. Since the target travel path P is generated based on multiple paths such as work paths P1 and connection paths P2, a predetermined number of paths configuring the target travel path P is set as a unit path group so that the target travel path P is divided into multiple unit path groups. The unit path group information is path information related to each of the unit path groups, and the terminal electronic control unit 52 can sequentially transmit unit path group information every time a predetermined transmission timing comes. The portable communication terminal 3 corresponds to a communication terminal, and a terminal-side communication unit is configured with the terminal electronic control unit 52 and the communication module 55 and a vehicle-side communication unit is configured with the onboard electronic control unit 18 and the communication module 25.

For example, the transmission timing can be set such that the start timing of automatic traveling is the first transmission timing and, thereafter, a transmission timing comes every time a predetermined time period elapses. In addition, it is possible to set such that the start timing of automatic traveling is the first transmission timing and, thereafter, a transmission timing comes at the timing when the tractor 1 reaches a location that is a predetermined distance behind the start position of the next unit path group. Regarding the transmission timing, it is only required that, before the automatic traveling transitions from a given unit path group to the next unit path group, the unit path group information related to the next unit path group is transmitted, and the timing to be set as a transmission timing can be modified as appropriate.

Based on the flowchart of FIG. 10, an explanation is given of the operation for making the tractor 1 automatically travel in a case where each unit path group information is sequentially transmitted as the travel path information. In the flowchart of FIG. 10, since Step #1 and Step #2 are the same as those in the flowchart of FIG. 9, the explanations thereof will be omitted.

Before starting the automatic traveling, by use of the communication module 55, the terminal electronic control unit 52 transmits the travel driving mode information and also transmits the first unit path group information and default information for starting the automatic traveling as the travel path information. The communication module 25 receives the travel driving mode information, unit path group information, and default information that are transmitted by the communication module 55, and thereby the communication for the travel driving mode information and the unit path group information is performed (Step #7).

Accordingly, before starting the automatic traveling, the onboard electronic control unit 18 acquires the travel driving mode information, the first unit path group information, and the default information. In this state, the determination unit 186 determines whether or not the travel driving mode selected by the travel driving mode selection unit 56 matches the travel driving mode of the work vehicle side, which is set on the tractor 1 side (Step #8).

In a case where the determination unit 186 determines that the travel driving modes do not match, the mismatched information notification unit 187 provides a notification of the mismatched information (Step #9 in a case of No in Step #8). Thereafter, as in the case of FIG. 9, a restoration work such as the travel driving mode modification work is performed.

In a case where the determination unit 186 determines that the travel driving modes match, the onboard electronic control unit 18 starts executing the automatic travel control, based on the first unit path group information and the default information, upon receiving an instruction for starting the automatic traveling (Step #10 in a case of Yes in Step #8).

When a transmission timing comes during execution of the automatic travel control by the onboard electronic control unit 18, the terminal electronic control unit 52 transmits the travel driving mode information and the second unit path group information by use of the communication module 55, and thereby the communication for the travel driving mode information and the unit path group information is performed (Step #12 in a case of Yes in Step #11).

The determination unit 186 determines whether or not the travel driving mode selected by the travel driving mode selection unit 56 matches the travel driving mode of the work vehicle side, which is set on the tractor 1 side, and, in a case where the travel driving modes do not match, the mismatched information notification unit 187 provides a notification of the mismatched information (Step #14 in a case of No in Step #13). Note that, in Step #13, in a case where the determination unit 186 determines that the travel driving modes do not match, the onboard electronic control unit 18 stops the automatic traveling of the tractor 1 and temporarily stops the automatic travel control.

In a case where the determination unit 186 determines that the travel driving modes match, the onboard electronic control unit 18 continues the execution of the automatic travel control, based on the second unit path group information received by the communication module 25 (Step #15 in a case of Yes in Step #13).

Thereafter, until the automatic travel control is ended, the terminal electronic control unit 52 transmits the travel driving mode information and the next unit path group information every time a transmission timing comes, so as to perform the communication for travel driving mode information and unit path group information (in a case of No in Step #16). Accordingly, the operations of Steps #11 to #15 are repeatedly performed until the automatic travel control is ended. In this way, the terminal electronic control unit 52 divides the travel path information into multiple unit path group information and sequentially transmits each unit path group information, and the onboard electronic control unit 18 confirms that the travel driving modes match and continues the automatic travel control, based on the sequentially-transmitted unit path group information.

In the flowchart illustrated in FIG. 10, the terminal electronic control unit 52 divides the travel path information into multiple unit path group information and sequentially transmits each unit path group information, instead of transmitting information of all of the information at once. Therefore, even in a case where the initial target travel path P is modified to a different target travel path P during execution of the automatic travel control by the onboard electronic control unit 18, it is possible to perform the automatic travel control with the modified target travel path P by transmitting the unit path group information of the modified target travel path P.

For example, in a case where the setting of the travel driving mode is modified by the travel driving mode selection unit 56, it is possible for the travel path generation unit 53 to regenerate a target travel path P including a connection path P2 by use of the turning radius corresponding to the travel driving mode after the modification of setting. Therefore, the terminal electronic control unit 52 can modify the target travel path P to be the subject of the automatic travel control from the initial target travel path P to the regenerated target travel path P. In accordance with the modification of the target travel path P, the terminal electronic control unit 52 transmits the unit path group information of the modified target travel path P by use of the communication module 55. The onboard electronic control unit 18 can perform the automatic travel control based on the unit path group information of the modified target travel path P, which is received by the communication module 25.

In a case where the target travel path P is modified, it is also possible for the terminal electronic control unit 52 to transmit the travel driving mode information related to the travel driving mode after the modification of setting, in addition to the unit path group information of the modified target travel path P. In this case, since the travel driving mode after the modification of setting is different from the travel driving mode of the work vehicle side, the determination unit 186 determines that the travel driving modes do not match. However, since the user or the like can modify the travel driving mode of the work vehicle side so as to match the travel driving mode after the modification of setting, it is possible for the onboard electronic control unit 18 to perform the automatic travel control with the modified target travel path P. Further, as described later in the second embodiment, in a case where the travel driving mode modification unit 188 is included, the travel driving mode of the work vehicle side can be automatically modified by the travel driving mode modification unit 188.

In this way, even in a case where the target travel path P is modified in accordance with modification of the setting of the travel driving mode by the travel driving mode selection unit 56 during execution of the automatic travel control by the onboard electronic control unit 18, it is possible to make the tractor 1 automatically travel along the modified target travel path P.

Since multiple connection paths P2 are generated as the target travel path P, it is possible not only to make the automatic traveling be performed in the same travel driving mode on all of the multiple connection paths P but also to select multiple travel driving modes so that the travel driving mode for automatic traveling on a given connection path P2 becomes different from the travel driving mode for automatic traveling on another connection path P2, for example.

For example, regarding the target travel path P, it is possible to select the four-wheel travel driving mode for the first and a predetermined number of connection paths P2 and to select the two-wheel travel driving mode for the subsequent connection paths P2 after the predetermined number. In this way, it is also possible to select different travel driving modes for multiple connection paths P.

Even in this case, the determination unit 186 determines whether or not the travel driving mode selected by the travel driving mode selection unit 56 matches the travel driving mode of the work vehicle side, which is set on the tractor 1 side, and, in a case where the travel driving modes do not match, the mismatched information notification unit 187 provides a notification of the mismatched information. The timing of the determination by this determination unit 186 is a timing before automatic traveling is performed on the connection path P for which a different travel driving mode is selected. Therefore, for example, when the current position of the tractor 1 reaches a position behind the connection path P2 (for example, a position on the work path P1 that is a predetermined distance behind the start point of the connection path P2), the determination unit 186 determines whether or not the travel driving mode selected by the travel driving mode selection unit 56 matches the travel driving mode of the work vehicle side, which is set on the tractor 1 side.

Second Embodiment

This second embodiment shows another embodiment regarding the operation in a case where the determination unit 186 determines that the travel driving modes do not match in the first embodiment. Hereinafter, although an explanation is given of operation in this second embodiment, the rest of the configurations and operation is the same as that of the above-described first embodiment, the explanation thereof is omitted.

In the first embodiment, in a case where the determination unit 186 determines that the travel driving modes do not match (see Step #4, Step #8, and Step #13 in FIG. 9 and FIG. 10), a notification of the mismatched information is provided by the mismatched information notification unit 187. In the second embodiment, instead of or in addition to the notification of the mismatched information provided by the mismatched information notification unit 187, the travel driving mode of the work vehicle side is automatically modified.

For example, as illustrated in FIG. 2, the tractor 1 includes the travel driving mode modification unit 188 that modifies the travel driving mode of the work vehicle side so that the travel driving mode of the work vehicle side is made to match the travel driving mode selected by the travel driving mode selection unit 56. Since the travel driving mode modification unit 188 automatically modifies the travel driving mode of the work vehicle side, it is thereby possible to make the tractor 1 automatically travel without the travel driving mode modification work by the user or the like, so that the workload of the user or the like can be reduced.

Third Embodiment

As with the second embodiment, this third embodiment shows another embodiment regarding the operation in a case where the determination unit 186 determines that the travel driving modes do not match. Hereinafter, although an explanation is given of operation in this third embodiment, the rest of the configurations and operation is the same as that of the above-described first embodiment, the explanation thereof is omitted.

In a case where the determination unit 186 determines that the travel driving modes do not match (see Step #4, Step #8, and Step #13 in FIG. 9 and FIG. 10), the travel path generation unit 53 acquires the travel driving mode of the work vehicle side and regenerates the target travel path P by use of the turning radius corresponding to the travel driving mode of the work vehicle side, instead of or in addition to the notification of the mismatched information provided by the mismatched information notification unit 187. As illustrated in FIG. 2, the portable communication terminal 3 includes the travel driving mode acquisition unit 93 that acquires the travel driving mode of the work vehicle side, which is set on the tractor 1 side, by use of the communication modules 25 and 55.

The travel path generation unit 53 specifies the turning radius corresponding to the travel driving mode of the work vehicle side, which is acquired by the travel driving mode acquisition unit 93, and regenerates the target travel path P so as to generate a connection path P2 by use of the specified turning radius.

When the target travel path P is regenerated by the travel path generation unit 53, the terminal electronic control unit 52 transmits the travel driving mode information (information indicating the travel driving mode of the work vehicle side) and the travel path information and unit path group information, which are related to the regenerated target travel path P, by use of the communication module 55. Accordingly, the travel driving mode indicated by the travel driving mode information received by the communication module 25 matches the travel driving mode of the work vehicle side, so that it is possible for the onboard electronic control unit 18 to perform the automatic travel control by use of the travel path information and unit path group information related to the regenerated target travel path P, so as to make the tractor 1 automatically travel along the regenerated target travel path P.

Fourth Embodiment

This fourth embodiment shows another embodiment of the configuration for the travel path generation unit 53 to generate the target travel path P by use of the turning radius corresponding to the travel driving mode in the above-described first embodiment. Hereinafter, although an explanation is given of a configuration in this fourth embodiment, the rest of the configurations is the same as that of the above-described first embodiment, the explanation thereof is omitted.

In the first embodiment, the travel driving mode selection unit 56 that selects one travel driving mode from multiple travel driving modes is included, and the travel path generation unit 53 generates the target travel path P by use of the turning radius corresponding to the travel driving mode selected by the travel driving mode selection unit 56.

On the other hand, in the fourth embodiment, as with the above-described third embodiment, the portable communication terminal 3 includes the travel driving mode acquisition unit 93 that acquires the travel driving mode of the work vehicle side, which is set on the tractor 1 side, by use of the communication modules 25 and 55. The travel path generation unit 53 generates the target travel path P by use of the turning radius corresponding to the travel driving mode of the work vehicle side, which is acquired by the travel driving mode acquisition unit 93.

Accordingly, the travel driving mode selection unit 56 does not have to be included in the portable communication terminal 3, and the travel driving mode acquisition unit 93 can automatically acquire the travel driving mode of the work vehicle side, which is set on the tractor 1 side. The travel path generation unit 53 can generate a proper target travel path P by use of the turning radius corresponding to the travel driving mode of the work vehicle side, which is actually set on the tractor 1 side.

In this case, since the travel path generation unit 53 generates the target travel path P according to the travel driving mode of the work vehicle side, the travel driving mode used for generating the target travel path P matches the travel driving mode that is set on the tractor 1 side. Therefore, it is not necessary for the determination unit 186 to determine whether or not the travel driving modes match and for the terminal electronic control unit 52 to transmit the travel driving mode information related to the travel driving mode by use of the communication module 55.

OTHER EMBODIMENTS

Explanations are given of other embodiments of the present invention. Note that the configuration of each embodiment explained below can be applied not only independently but also in combination with the configuration of another embodiment.
(1) The configuration of the work vehicle can be modified in various ways. For example, it is also possible that the work vehicle is configured as a hybrid model including the engine 9 and an electric motor for driving, and, alternatively, it is also possible that the work vehicle is configured as an electric model including an electric motor for driving instead of the engine 9. For example, it is also possible that the work vehicle is configured as a semi-crawler model including left and right crawlers as traveling parts, instead of the left and right rear wheels 6. For example, it is also possible that the work vehicle is configured as a rear-wheel-steering model in which the left and right rear wheels 6 function as the steering wheels.
(2) In the above-described embodiments, in a case where the travel driving mode selection unit 56 selects one travel driving mode from multiple travel driving modes, the terminal electronic control unit 52 specifies the turning radius, based on the vehicle body information stored in the terminal storage unit 54 in addition to the selected information. To specify the turning radius, the specification can also be made based only on the selected information of the one travel driving mode, which is selected from multiple travel driving modes by the travel driving mode selection unit 56.
(3) Although the example in which the travel path generation unit 53 and the travel driving mode selection unit 56 are included in the portable communication terminal 3 is shown in the above-described embodiments, it is also possible that the travel path generation unit 53 and the travel driving mode selection unit 56 are included on the work vehicle side of the tractor 1 or included in an external management apparatus, for example.

INDUSTRIAL APPLICABILITY

The present invention can be applied to various kinds of automatic travel systems that make a work vehicle automatically travel along a target travel path.

DESCRIPTION OF REFERENCE NUMERALS

1 tractor (work vehicle)
3 portable communication terminal (communication terminal)
18 onboard electronic control unit (automatic travel control unit, vehicle-side communication unit)
25 communication module (vehicle-side communication unit)
52 terminal electronic control unit (terminal-side communication unit)
53 travel path generation unit
55 communication module (terminal-side communication unit)
56 travel driving mode selection unit
93 travel driving mode acquisition unit
186 determination unit
187 mismatched information notification unit
188 travel driving mode modification unit

The invention claimed is:
1. An automatic travel system comprising:
a travel driving mode selection unit that is capable of selecting one travel driving mode from a plurality of travel driving modes as a travel driving mode of a work vehicle with front and rear wheels;
a travel path generation unit that generates a target travel path by use of a turning radius corresponding to the travel driving mode selected by the travel driving mode selection unit; and
an automatic travel control unit that performs automatic travel control for making the work vehicle automatically travel along the target travel path generated by the travel path generation unit, based on positioning information of the work vehicle which is acquired by a satellite positioning system, wherein
the travel driving mode of the work vehicle, in which the turning radius when turning the work vehicle varies accordingly, includes at least a four-wheel travel driving mode in which the work vehicle is driven by a four-wheel drive and a double-speed driving mode in which the front wheels rotate faster than the rear wheels when turning the work vehicle.
2. An automatic travel system comprising:
a travel driving mode acquisition unit that acquires a travel driving mode that is set on a work vehicle with front and rear wheels;
a travel path generation unit that generates a target travel path by use of a turning radius corresponding to the travel driving mode acquired by the travel driving mode acquisition unit; and
an automatic travel control unit that performs automatic travel control for making the work vehicle automatically travel along the target travel path generated by the travel path generation unit, based on positioning information of the work vehicle which is acquired by a satellite positioning system, wherein
the travel driving mode of the work vehicle, in which the turning radius when turning the work vehicle varies accordingly, includes at least a four-wheel travel driving mode in which the work vehicle is driven by a four-wheel drive and a double-speed driving mode in which the front wheels rotate faster than the rear wheels when turning the work vehicle.

3. An automatic travel system comprising:
a travel driving mode selection unit that is capable of selecting one travel driving mode from a plurality of travel driving modes as a travel driving mode of a work vehicle;
a travel path generation unit that generates a target travel path by use of a turning radius corresponding to the travel driving mode selected by the travel driving mode selection unit;
an automatic travel control unit that performs automatic travel control for making the work vehicle automatically travel along the target travel path generated by the travel path generation unit, based on positioning information of the work vehicle which is acquired by a satellite positioning system, in a case where a travel driving mode of a work vehicle side, which is set on the work vehicle, matches the travel driving mode selected by the travel driving mode selection unit; and
a mismatched information notification unit that provides a notification of mismatched information, which indicates a mismatch of the travel driving modes, in a case where the travel driving mode of the work vehicle side does not match the travel driving mode selected by the travel driving mode selection unit.

4. The automatic travel system according to claim 3 comprising a travel driving mode modification unit that modifies the travel driving mode of the work vehicle side, so that the travel driving mode of the work vehicle side matches the travel driving mode selected by the travel driving mode selection unit, in a case where the travel driving mode of the work vehicle side does not match the travel driving mode selected by the travel driving mode selection unit.

5. The automatic travel system according to claim 3, wherein, in a case where the travel driving mode of the work vehicle side does not match the travel driving mode selected by the travel driving mode selection unit, the travel path generation unit regenerates a target travel path by use of a turning radius corresponding to the travel driving mode of the work vehicle side.

6. The automatic travel system according to claim 3,
wherein a communication terminal includes the travel driving mode selection unit, the travel path generation unit, and a terminal-side communication unit,
wherein the work vehicle includes a vehicle-side communication unit, which is capable of communicating information with the terminal-side communication unit, and the automatic travel control unit,
wherein the terminal-side communication unit is configured to be capable of transmitting travel driving mode information, which is related to the travel driving mode selected by the travel driving mode selection unit, and capable of dividing the target travel path into a plurality of unit path groups, so as to have unit path group information related to the unit path groups, and sequentially transmitting each unit path group information as travel path information related to the target travel path,
wherein the automatic travel system comprises a determination unit that determines whether or not a travel driving mode based on the travel driving mode information, which is received by the vehicle-side communication unit, matches the travel driving mode of the work vehicle side, and
wherein the automatic travel control unit performs the automatic drive control, based on the unit path group information that is sequentially received by the vehicle-side communication unit in a state where the determination unit determines that the travel driving modes match.

* * * * *